March 10, 1970   O. HAUSINGER   3,499,349
FRICTION BLOCKING DIFFERENTIAL FOR VEHICLES
Filed May 9, 1968
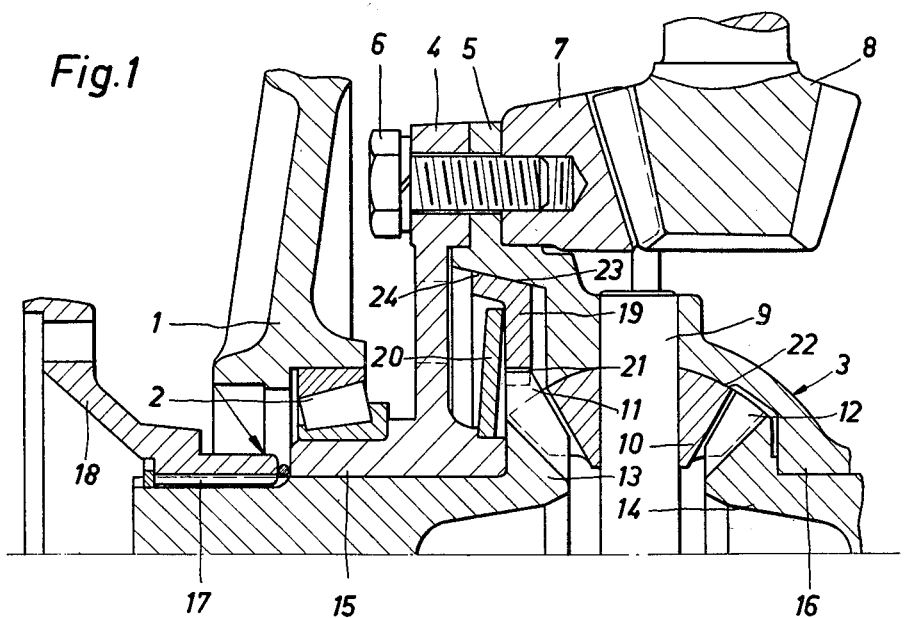
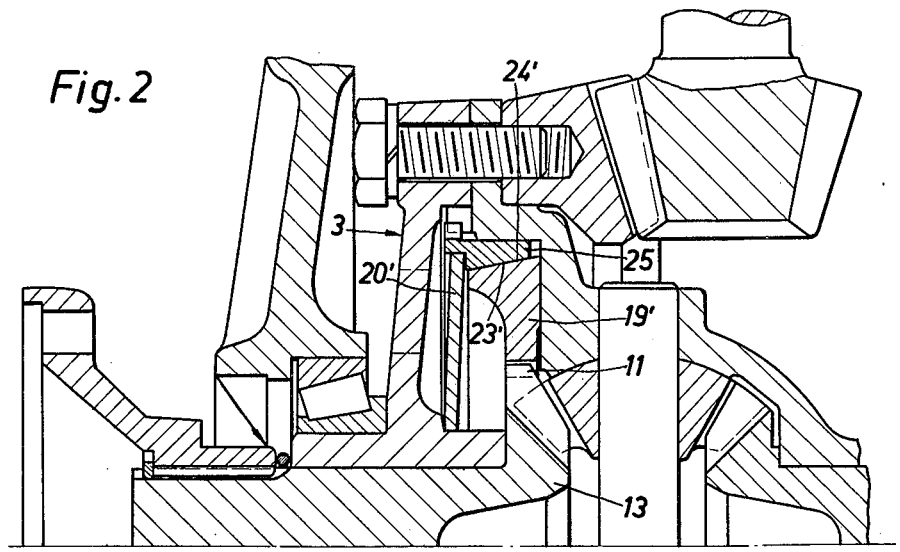
Inventor:
OTTO HAUSINGER
ATTORNEYS

United States Patent Office 3,499,349
Patented Mar. 10, 1970

3,499,349
FRICTION BLOCKING DIFFERENTIAL FOR VEHICLES
Otto Hausinger, Im Grimmle 8, Gerlingen,
Wurttemberg, Germany
Filed May 9, 1968, Ser. No. 727,952
Claims priority, application Germany, May 9, 1967,
1,630,931
Int. Cl. F16h 1/44
U.S. Cl. 74—710.5                                    10 Claims

ABSTRACT OF THE DISCLOSURE

Limited slip is obtained by means of a friction element spring biased into engagement with the differential cage and secured for rotation with one of the differential side bevel gears by means of teeth that interengage with the side bevel gear teeth. The side bevel gear teeth may extend beyond the bearing surface for the differential bevel gears, an annular cup spring may provide the bias and the friction surfaces may be conical. The cage friction surface may be carried by a friction ring mounted on the cage for rotation therewith.

BACKGROUND OF THE INVENTION

It is known to provide a friction blocking differential with differential bevel gears rotatably mounted within a driven differential cage, which bevel gears are in constant meshing engagement with axle shaft or side bevel gears for driving respective ones of the vehicle wheels; one of the side bevel gears rotatably carrying a friction element having a friction surface resiliently pressed into engagement with a corresponding counter friction surface of the cage by means of a spring.

It is known to provide an axially extending splined connection between the friction element and the shaft of the corresponding side bevel gear. With this construction, the friction element is under the load of the compressed spring and additionally under the spreading effect of the side bevel gear teeth, which side bevel gear is mounted for axial displacement and which load is dependent upon the torque transmitted by the differential gear arrangement. Such a construction has the decided disadvantage that it is necessary to employ specific constuctions in addition to those normally present in a differential gear arrangement for the mounting of the friction element, which additional constructions are unduly expensive, complicated and space consuming.

SUMMARY OF THE INVENTION

It is an object of the present invention to provide a self-friction blocking differential gear arrangement having the customary gearing system in combination with a simple and compact blocking mechanism.

This is accomplished, in accordance with the present invention, by providing the friction element with teeth for engaging the teeth of the one side bevel gear to establish a driving connection therebetween. Due to this advantageous construction of the friction element, different additional means forming the driving connection between the friction element and side bevel gear are eliminated, which results in a simplification of the differential gear arrangement that is considerably less expensive when compared with the known arrangements. With the above construction of the present invention resulting in the omission of the additional mounting and drive means when compared with the known arrangements, the differential gear arrangement of the present invention can be made more compact with the same torque capacity when compared to a similar known arrangement. This results in considerable advantageous effects, particularly when installing the differential gear arrangement of the present invention, for example with a front wheel drive vehicle. Additional advantages are gained by radially extending the teeth of the side bevel gear outwardly beyond the bearing surfaces of the differential bevel gears with the cage and into meshing engagement with the inwardly extending tooth-like recesses of the friction element. Preferably, the friction element is provided with a conical frictional surface, known per se, to advantageously cooperate with a correspondingly shaped counter friction surface of the cage under the influence of a cup spring having a predetermined force. Thereby, a constantly acting friction engagement or coupling of the two axle shafts is obtained to resist or avoid spinning of one wheel in engagement with a slick surface, for example ice.

Preferably, the cage friction surface is provided on a friction ring rotatably connected with the remainder of the cage so that the friction surface characteristics may be precisely provided as desired to be most favorable. Particularly, the friction ring may be produced from a material having the most favorable friction characteristics or it can be provided on its friction surface in a simple manner with a layer of friction material, for example wear-resistant molybdenum. Preferably, the friction ring is mounted to the cage for axial displacement under the direct load of the spring.

BRIEF DESCRIPTION OF THE DRAWING

Further objects, features and advantages of the present invention will become more clear from the following detailed description of the preferred embodiments of the invention with respect to the attached drawing, wherein:

FIGURE 1 is a partial cross sectional view taken through the axis of the side bevel gears of a differential gear arrangement according to the present invention; and FIGURE 2 is a similar partial cross sectional view with a modification of the FIGURE 1 device.

DETAILED DESCRIPTION OF THE DRAWING

As shown in FIGURE 1, the differential gear arrangement of the present invention is provided in an axle gear housing 1 only partially shown because it may be of conventional construction. In a conventional manner, roller bearings 2 (only one of which is shown) are provided for rotatably mounting the differential cage 3 within the axle housing 1. The differential cage 3 is constructed of two halves 4 and 5, which have radially outer connecting flanges connected together by means of a plurality of screws 6 (only one being shown). The screws 6 also serve for connecting the differential cage 3 with the ring bevel gear 7, which gear is in constant meshing engagement with the drive bevel pinion 8 of a suitable transmission (not shown).

Mounted to and within the differential cage 3 there is a spider arrangement or pin 9. Although only one is shown, a plurality of differential bevel gears 10 are freely rotatably mounted on the pin 9. The illustrated bevel gear 10 is in constant meshing engagement with the teeth 11 and 12 of axle shaft or differential side bevel gears 13 and 14, respectively. The axle shaft bevel gears 13, 14 are rotatably supported in bearing flanges 15 and 16, respectively, of the differential cage 3. Since the axle shaft bevel gears 13, 14 are identical with respect to their outer portions, the outer portion of only one is shown in detail; the axle shaft bevel gear 13 is provided with an axially extending spline tooth engagement with the hub of a coupling part 18 on its end opposite from its teeth 11. The coupling part 18 is provided for driving connection directly with the respective axle shaft (not shown).

Structure to be described below provides a constant frictional engagement resisting to a certain extent the relative rotation of axle shaft bevel gears 13 and 14, with respect to the differential bevel gears 10 during the spinning of one wheel of the vehicle, for example spinning on ice. As viewed in FIGURE 1, a friction element 19 is spring urged toward the right by the annular cup spring 20 that is supported within the cage 3. The interior portion of the annular friction element 19 is provided with tooth-like recesses 21 for engaging with a portion of at least some of the teeth 11 of the axle shaft bevel gear 13. For this purpose, the teeth 11 are provided with portions radially extending beyond the bearing surface 22 between the differential bevel gear 10 and the interior of the cage 3. The friction element 19 is provided at its radially outer surface, with respect to the axis of the axle shaft bevel gears, with a conical friction surface 23. The friction surface 23 is in constant engagement with a correspondingly shaped conical counter friction surface 24 of the half 5 of the cage 3.

With respect to the modification of FIGURE 2, corresponding numerals have been used for corresponding parts and the description of elements identical with those shown in FIGURE 1 will be dispensed with for simplicity. Primarily, the modification of FIGURE 2 differ from the device of FIGURE 1 in that the cage 3 of the differential gear does not directly form the friction surface 24' that constantly engages the friction surface 23' of the friction ring 19', which ring is rotatably entrained by the teeth 11 of the axle shaft bevel gear 13. In contrast to the FIGURE 1 construction, the counter friction surface 24' as shown in FIGURE 2 is provided on a separate friction ring 25. The friction ring 25 is rotatably coupled with the cage 3 of the differential gear arrangement in an axially displaceable manner by means of interengaging teeth 26. The annular cup spring 20' directly engages between the cage 3 and the friction ring 25 for providing the bias for the friction element 19'.

Two embodiments of the present invention have been specifically described for purposes of illustration, and further modifications, embodiments and variations are contemplated within the spirit and scope of the present invention as determined by the following claims.

I claim:

1. In a friction blocking differential gear arrangement having a driven differential cage provided with opposed axle driving side bevel gears provided with teeth interengaging with the teeth of at least one differential bevel gear carried by the cage, and a friction element rotatably drivingly connected with at least one of the side bevel gears and having a friction surface resiliently urged into engagement with a friction surface drivingly connected to the differential cage, the improvement comprising: said friction element having at least one recess interengaging with at least one of said teeth of the one side bevel gear providing the driving connection between the friction element and the one side bevel gear.

2. The differential gear arrangement according to claim 1, wherein said differential bevel gear and said differential cage have cooperating engaging bearing surfaces and at least one of said one side bevel gear teeth extending radially, with respect to its axis, beyond said bearing surfaces for engagement with said recess of said friction element.

3. The differential gear arrangement according to claim 1, wherein said friction element friction surface and said differential cage friction surface are each correspondingly conical, and including a cup spring means resiliently pressing said friction surfaces together to provide the resiliently urged engagement.

4. The differential gear arrangement according to claim 3, wherein said differential cage includes a separate annular friction ring provided with said differential cage friction surface drivingly interconnected with the remainder of said differential cage for rotation therewith.

5. The differential gear arrangement according to claim 4, wherein said friction ring is mounted for axial movement with respect to said remainder of said differential cage and said cup spring means directly engages between said remainder of said differential cage and said friction ring.

6. The differential gear arrangement according to claim 4, wherein said friction element is annular with one friction surface extending substantially perpendicular to the axes of said side bevel gears and a second friction surface conical with respect to said axes; said remainder of said differential cage having one friction surface in engagement with said friction element one friction surface and a second cylindrical friction surface concentric with said axes; said friction ring having a cylindrical outer surface in engagement with said second cylindrical friction surface and a conical inner surface in engagement with said conical surface of said friction element; said remainder of said differential cage and said differential cage friction ring having interengaging teeth forming a driving connection therebetween.

7. The differential gear arrangement according to claim 1, wherein said differential cage includes a first cage half rotatably mounting said differential bevel gear and a second cage half forming an annular chamber with said first cage half containing therein said friction element; said friction element being annular.

8. The differential gear arrangement according to claim 7, wherein said first and second cage halves have engaging outer connecting flanges; and including a ring bevel gear engaging the outer connecting flange of said first cage half; at least one threaded connecting member extending through said connecting flanges and into said ring bevel gear.

9. The differential gear arrangement according to claim 8, wherein each tooth of said one side bevel gear includes a radially inner portion in engagement with said differential bevel gear and a radially outer portion in engagement with said friction element; said side bevel gears being substantially identical except for said radially outer friction element engaging portion for each tooth of said one side bevel gear.

10. The differential gear arrangement according to claim 1, wherein each tooth of said one side bevel gear includes a radially inner portion in engagement with said differential bevel gear and a radially outer portion in engagement with said friction element; said side bevel gears being substantially identical except for said radially outer friction element engaging portion for each tooth of said one side bevel gear.

References Cited

UNITED STATES PATENTS

| | | | |
|---|---|---|---|
| 3,051,020 | 8/1962 | Hartupee | 74—710.5 |
| 3,055,234 | 9/1962 | O'Brien | 74—711 |
| 3,344,688 | 10/1967 | Frost | 74—711 |

LEONARD H. GERIN, Primary Examiner

UNITED STATES PATENT OFFICE
CERTIFICATE OF CORRECTION

Patent No. 3,499,349　　　　　　　　　　　　　　March 10, 1970

Otto Hausinger

It is certified that error appears in the above identified patent and that said Letters Patent are hereby corrected as shown below:

In the heading to the printed specification, lines 4 and 5, "Otto Hausinger, Im Grimmle 8, Gerlinger, Wurttemberg, Germany" should read -- Otto Hausinger, Gerlinger, Wurttemberg, Germany, assignor to Firma Dr.-Ing. h.c.F. Porsche KG, Stuttgart-Zuffenhausen, Germany --.

Signed and sealed this 15th day of December 1970.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents